United States Patent
Mohammed et al.

(10) Patent No.: US 9,575,748 B2
(45) Date of Patent: *Feb. 21, 2017

(54) DEVELOPMENT, PROGRAMMING, AND DEBUGGING ENVIRONMENT

(71) Applicant: Cypress Semiconductor Corporation, San Jose, CA (US)

(72) Inventors: Haneef Mohammed, Beaverton, OR (US); Jack Griffin, West Linn, OR (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/272,376

(22) Filed: May 7, 2014

(65) Prior Publication Data

US 2014/0245263 A1    Aug. 28, 2014

Related U.S. Application Data

(63) Continuation of application No. 13/740,022, filed on Jan. 11, 2013, now Pat. No. 8,752,033, which is a continuation of application No. 12/776,175, filed on May 7, 2010, now abandoned.

(60) Provisional application No. 61/176,272, filed on May 7, 2009.

(51) Int. Cl.
| | |
|---|---|
| *G06F 9/45* | (2006.01) |
| *G06F 9/44* | (2006.01) |
| *G06F 17/50* | (2006.01) |
| *G06F 11/36* | (2006.01) |

(52) U.S. Cl.
CPC ............ *G06F 8/71* (2013.01); *G06F 8/20* (2013.01); *G06F 8/30* (2013.01); *G06F 11/362* (2013.01); *G06F 17/5054* (2013.01); *G06F 2217/68* (2013.01)

(58) Field of Classification Search
CPC .. G06F 17/50; G06F 17/5063; G06F 17/5045; G01R 31/3167; G01R 31/3177; H03K 19/017581; H03K 19/17728
See application file for complete search history.

(56) References Cited

U.S. PATENT DOCUMENTS

| | | |
|---|---|---|
| 4,839,638 A | 6/1989 | Kosler et al. |
| 5,253,181 A | 10/1993 | Marui et al. |

(Continued)

OTHER PUBLICATIONS

Lothar Nowa; Verification of Hardware Descriptions by Retargetable Code Generation; 1989 ACM; pp. 441-447; <http://dl.acm.org/citation.cfm?id=74456>.*

(Continued)

*Primary Examiner* — Thuy Dao
*Assistant Examiner* — Cuong V Luu (57) ABSTRACT

A method includes receiving hardware description code that generically describes circuitry, and translating the hardware description code into one or more configuration files specific to a programmable system. The method further includes generating program code for a microcontroller of the programmable system based, at least in part, on the hardware description code, and configuring the programmable system to implement the circuitry according to the configuration files and the program code.

17 Claims, 5 Drawing Sheets

(56) References Cited

U.S. PATENT DOCUMENTS

| | | | |
|---|---|---|---|
| 5,594,657 A * | 1/1997 | Cantone | G06F 17/5045 716/104 |
| 5,684,980 A | 11/1997 | Casselman | |
| 5,867,397 A * | 2/1999 | Koza | G06F 17/50 703/14 |
| 6,006,022 A | 12/1999 | Rhim et al. | |
| 6,279,150 B1 * | 8/2001 | Bachmann | G06F 8/52 717/136 |
| 6,453,456 B1 * | 9/2002 | Price | G06F 17/5027 716/117 |
| 6,469,743 B1 | 10/2002 | Cheney et al. | |
| 6,701,340 B1 | 3/2004 | Gorecki et al. | |
| 6,701,508 B1 * | 3/2004 | Bartz | G06F 17/5045 716/139 |
| 6,721,922 B1 | 4/2004 | Walters et al. | |
| 6,724,220 B1 * | 4/2004 | Snyder et al. | 326/39 |
| 6,802,026 B1 * | 10/2004 | Patterson et al. | 714/35 |
| 6,820,252 B2 * | 11/2004 | Sakamoto | G06F 9/45504 703/26 |
| 6,959,428 B2 | 10/2005 | Broberg et al. | |
| 6,968,514 B2 | 11/2005 | Cooke et al. | |
| 7,010,773 B1 | 3/2006 | Bartz et al. | |
| 7,069,526 B2 * | 6/2006 | Schubert | G01R 31/318357 716/102 |
| 7,159,204 B2 * | 1/2007 | Iotov | G11C 27/00 716/104 |
| 7,239,993 B2 | 7/2007 | Roesner et al. | |
| 7,302,667 B1 * | 11/2007 | Pritchard | G06F 17/5068 716/117 |
| 7,368,940 B1 * | 5/2008 | Schultz | 326/38 |
| 7,373,638 B1 | 5/2008 | Schliebusch et al. | |
| 7,434,181 B2 | 10/2008 | Colle et al. | |
| 7,437,719 B2 * | 10/2008 | Nagaraj | G06F 8/443 712/241 |
| 7,458,055 B2 | 11/2008 | Bentley et al. | |
| 7,472,369 B1 | 12/2008 | Bain et al. | |
| 7,500,228 B2 | 3/2009 | Holmes et al. | |
| 7,506,286 B2 | 3/2009 | Beardslee et al. | |
| 7,506,288 B1 | 3/2009 | Ip et al. | |
| 7,526,742 B1 | 4/2009 | Edwards | |
| 7,541,950 B2 * | 6/2009 | Wegener | 341/76 |
| 7,546,571 B2 | 6/2009 | Mankin et al. | |
| 7,562,001 B2 | 7/2009 | Arevalo et al. | |
| 7,562,347 B2 | 7/2009 | Baumgart et al. | |
| 7,574,688 B1 | 8/2009 | Ward et al. | |
| 7,594,196 B2 | 9/2009 | Hetzel | |
| 7,620,929 B1 * | 11/2009 | Jang | H03K 19/17736 326/38 |
| 7,620,942 B1 | 11/2009 | Ma et al. | |
| 7,650,586 B2 | 1/2010 | Koga et al. | |
| 7,650,856 B2 | 1/2010 | Quinta Cortinas et al. | |
| 7,729,898 B1 | 6/2010 | Lytle | |
| 7,765,512 B1 * | 7/2010 | Neuendorffer | G06F 17/5054 326/41 |
| 7,784,005 B1 | 8/2010 | Ng | |
| 7,856,546 B2 * | 12/2010 | Casselman et al. | 712/43 |
| 7,873,934 B1 * | 1/2011 | Perry | G06F 17/5054 716/104 |
| 7,877,721 B2 * | 1/2011 | Schleicher, II | G06F 17/505 716/117 |
| 7,890,910 B1 * | 2/2011 | Hutton | H03K 19/1736 716/117 |
| 7,904,850 B2 | 3/2011 | Spackman et al. | |
| 8,125,360 B1 | 2/2012 | Kutz et al. | |
| 8,219,960 B1 | 7/2012 | Neuendorffer et al. | |
| 8,299,559 B2 * | 10/2012 | Nazarian | H03K 19/01758 257/499 |
| 8,402,409 B1 * | 3/2013 | Janneck | G06F 17/5054 716/103 |
| 8,448,150 B2 | 5/2013 | Kim et al. | |
| 8,527,949 B1 | 9/2013 | Pleis et al. | |
| 8,555,217 B1 | 10/2013 | Khong et al. | |
| 8,975,916 B1 * | 3/2015 | Yarlagadda | G06F 1/26 326/38 |
| 9,140,752 B2 * | 9/2015 | Oshima | G01R 31/3177 |
| 9,312,831 B2 * | 4/2016 | Nestler | H03H 15/02 |
| 2003/0131325 A1 | 7/2003 | Schubert et al. | |
| 2003/0192032 A1 | 10/2003 | Andrade et al. | |
| 2004/0168136 A1 | 8/2004 | Mau | |
| 2005/0088867 A1 * | 4/2005 | Iotov et al. | 365/45 |
| 2005/0246599 A1 | 11/2005 | Simpson et al. | |
| 2006/0036988 A1 | 2/2006 | Allen et al. | |
| 2006/0171104 A1 | 8/2006 | Vayssiere | |
| 2008/0195856 A1 | 8/2008 | Ford et al. | |
| 2009/0128189 A1 | 5/2009 | Madurawe et al. | |
| 2010/0018798 A1 | 1/2010 | Jeon et al. | |
| 2010/0153898 A1 | 6/2010 | Roesner et al. | |
| 2010/0185798 A1 | 7/2010 | Kuehnl et al. | |
| 2011/0145781 A1 | 6/2011 | Chen et al. | |

OTHER PUBLICATIONS

Giovanni De Micheli; Computer-Aided Hardware-Software Codesign; 1994 IEEE; pp. 10-16; <http://ieeexplore.ieee.org/stamp/stamp.jsp?tp=&arnumber=296153>.*

Wayne Luk et al.; Pebble A Language for Parametrised and Reconfigurable Hardware Design; 2006 Springer; pp. 9-18; <http://link.springer.com/chapter/10.1007/BFb0055228>.*

Didier Keymeulen et al.; Fault-Tolerant Evolvable Hardware Using Field-Programmable Transistor Arrays; 2000 IEEE; pp. 305-316; <http://ieeexplore.ieee.org/stamp/stamp.jsp?tp=&arnumber=914547>.*

Josef Fleischmann et al.; A Hardware Software Prototyping Environment for Dynamically Reconfigurable Embedded Systems; 1998 IEEE; 5 pages; <http://ieeexplore.ieee.org/stamp/stamp.jsp?tp=&arnumber=666246>.*

Donald E. Thomas et al.; A Model and Methodology for hardware-software codesign; 1993 IEEE; pp. 6-15; <http://ieeexplore.ieee.org/stamp/stamp.jsp?tp=&arnumber=232468>.*

Rainer Leupers; Retargetable Code Generation Based on Structural Processor Descriptions; 1995 Kluwer Academic Publisher; pp. 75-107; <http://link.springer.com/article/10.1023/A:1008807631619>.*

Ian Page; Constructing Hardware-Software Systems from a Single Description; 1995 Kluwer Academic Publisher; pp. 87-107; <http://link.springer.com/article/10.1007/BF00936948>.*

Stephan Schulz et al.; Model-Based Codesign; 1998 IEEE; pp. 60-67; <http://ieeexplore.ieee.org/stamp/stamp.jsp?tp=&arnumber=707618>.*

Peter Marwedel; Tree-Based Mapping of Algorithms to Predefined Structures; 1993 IEEE; pp. 586-593; <http://ieeexplore.ieee.org/stamp/stamp.jsp?tp=&arnumber=580119>.*

William H. Mangione-Smith; Seeking Solutions in Configurable Computing; 1997 IEEE; pp. 38-43; <http://ieeexplore.ieee.org/stamp/stamp.jsp?tp=&arnumber=642810>.*

M.D. Edwards et al.; Software acceleration using programmable hardware devices; 1996 IEEE; pp. 55-63; <http://ieeexplore.ieee.org/stamp/stamp.jsp?tp=&arnumber=487926>.*

Keerthan Jaic; Enhancing Hardware Design Flows with MyHDL; 2015 ACM; pp. 28-31; <http://dl.acm.org/citation.cfm?id=2689092&CFID=847837691&CFTOKEN=30541425>.*

Sungwoo Park; Functional Netlists; 2008 ACM; pp. 353-365; <http://dl.acm.org/citation.cfm?id=1411253&CFID=847837691&CFTOKEN=30541425>.*

Kekoa Proudfoot; A Real-Time Procedural Shading System for Programmable Graphics Hardware; 2001 ACM; pp. 159-170; <http://dl.acm.org/citation.cfm?id=383275&CFID=847837691&CFTOKEN=30541425>.*

Jason Xin Zheng; Securing Netlist-Level FPGA Design through Exploiting Process Variation and Degradation; 2012 ACM; pp. 129-138; <http://dl.acm.org/citation.cfm?id=2145716&CFID=847837691&CFTOKEN=30541425>.*

Robert H. Bell, Jr.; Automatic Performance Model Synthesis From Hardware Verification Models; 2011 ACM; pp. 463-468; <http://dl.acm.org/citation.cfm?id=1958816&CFID=847837691&CFTOKEN=30541425>.*

(56) References Cited

OTHER PUBLICATIONS

Yusuke Endoh ; ASystemC an AOP Extension for Hardware Description Language; 2011 ACM; pp. 19-28; <http://dl.acm.org/citation.cfm?id=1960322&CFID=847837691&CFTOKEN=30541425>.*
U.S. Appl. No. 12/776,175: "Development, Programming, and Debugging Environment," Haneef Mohammed, filed May 7, 2010; 28 pages.
U.S. Appl. No. 13/740,022: "Development, Programming, and Debugging Environment" Haneef Mohammed et al., filed Jan. 11, 2013; 31 pages.
B.L. Hutchings et al., Assisting Network Intrusion Detection with Reconfigurable Hardware, 2002 IEEE, 10 pages, http://ieeexplore.ieee.org/stamp/stamp.jsp?tp=&arnumber=1106666.
Brad Hutchings et al., Seeking Solutions in configurable computing, 1997 IEEE, pp. 38-43, <http://ieeexplore.ieee.org/stamp/stamp.jsp?tp=&arnumber=642810>.
Daniel D. Gajski et al., Specification and Design of Embedded Hardware-Software Systems, 1995 IEEE, pp. 53-67, http://ieeexplore.ieee.org/stamp/stamp.jsp?tp=&arnumber=350695.
Giovanni De Micheli, Computer-Aided Hardware-software Codesign, 1994 IEEE, pp. 10-16, http://ieeexplore.ieee.org/stamp/stamp.jsp?tp=&arnumber=296153.
Ian Page, Constructing Hardware-software Systems from a Single Description, 1995 Journal of VLSI Signal Processing, pp. 87-107, <http://link.springer.com/article/10.1007/BF00936948>.
International Search Report for International Application No. PCT/US10/34103 dated Aug. 18, 2010; 2 pages.
Jean E. Vuilemin et al., Programmable Active Memories Reconfigurable Systems Come of Age, 1996 IEEE, pp. 56-69, <http://ieeexplore.ieee.org/stamp/stamp.jsp?tp=&arnumber=486081>.
Justin L. Tripp et al., Trident From High-Level Language to Hardware Circuitry, 2007 IEEE, pp. 28-37, http://ieeexplore.ieee.org/stamp/stamp.jsp?tp&arnumber=4133993.
M.D. Edwards et al., software acceleration using programmable hardware devices, 1995 IEEE Proceedings Online, pp. 55-63, <http://ieeexplore.ieee.org/stamp/stamp.jsp?tp=&arnumber=487926>.
Peter Marwedel, Tree-Based Mapping of Algorithms to Predefined Structures, 1993 IEEE, pp. 586-593, <http://ieeexplore.ieee.org/stamp/stamp.jsp?tp=&arnumber=580119>.
Reiner Hartenstein et al., A Decade of Reconfigurable Computing a Visionary Retrospective, 2001IEEE, pp. 642-649, http://dl.acm.org/citation.cfm?id=367839.
Reiner Hartenstein, Coarse Grain Reconfigurable Architectures, 2001 IEEE, pp. 564-569, <http://dl.acm.org/citation.cfm?id=370535>.
SIPO 1st Office Action for Application No. 201080019824.3 dated Mar. 16, 2014; 7 pages.
USPTO Advisory Action for U.S. Appl. No. 13/740,022 dated Oct. 16, 2013; 3 pages.
USPTO Final Rejection for U.S. Appl. No. 12/776,175 dated Sep. 17, 2013; 20 pages.
USPTO Final Rejection for U.S. Appl. No. 13/004,001 dated May 24, 2013; 11 pages.
USPTO Final Rejection for U.S. Appl. No. 13/740,022 dated Aug. 7, 2013; 18 pages.
USPTO Non Final Rejection for U.S. Appl. No. 12/776,175 dated Feb. 7, 2014; 20 pages.
USPTO Non-Final Rejection for U.S. Appl. No. 12/776,175 dated Jun. 12, 2013; 20 pages.
USPTO Non-Final Rejection for U.S. Appl. No. 13/004,001 dated Nov. 2, 2012; 42 pages.
USPTO Non-Final Rejection for U.S. Appl. No. 13/740,022 dated Jun. 5, 2013; 17 pages.
USPTO Non-Final Rejection for U.S. Appl. No. 13/740,022 dated Dec. 4, 2013; 20 pages.
USPTO Notice of Allowance for U.S. Appl. No. 13/740,022 dated Feb. 5, 2014; 7 pages.
USPTO Notice of Allowance for U.S. Appl. No. 13/740,022 dated Mar. 18, 2014; 8 pages.
Wayne Luk et al., Pebble: A Language for Parametrised and Reconfigurable Hardware Design, 1998 Computer Science, pp. 9-18, http://link.springer.com/chapter/10.1007BFb0055228.
Written Opinion of the International Searching Authority for International Application No. PCT/US10/34103 mailed Aug. 18, 2010; 5 pages
SIPO 4 Month Office Action for Application No. 102080019824.3 dated Feb. 7, 2014;; 4 pages.
SIPO Office Action for Application No. 201080019824.3 dated Jul. 1, 2015; 6 pages.
SIPO Office Action for Application No. 201080019824.3 dated Oct. 16, 2014; 7 pages.
A Ghosh, A Hardware-Software Co-simulator for Embedded System Design and Debugging http://www.cecs.uci.edu; 3 pages, 1995 IEEE.
U.S. Appl. No. 13/004,001: "Development, Programming, and Debugging Environment" Haneef Mohammed et al., filed on Jan. 10, 2011; 29 pages.
R. Klein, "Miami: a hardware software co-simulation environment", 1996.
SIPO 4 Month Office Action for Application No. 201080019824.3 dated Feb. 7, 2014; 4 pages.
SIPO Office Action for Application No. 201080019824.3 dated Nov. 19, 2013; 4 pages.
USPTO Final Rejection for U.S. Appl. No. 14/035,836 dated Apr. 11, 2016; 2 pages.
USPTO Final Rejection for U.S. Appl. No. 14/035,836 dated Apr. 22, 2015; 3 pages.
USPTO Final Rejection for U.S. Appl. No. 14/035,836 dated Jan. 28, 2015; 48 pages.
USPTO Final Rejection for U.S. Appl. No. 14/035,836 dated Feb. 3, 2016; 42 pages.
USPTO Final Rejection for U.S. Appl. No. 14/035,836 dated Sep. 2, 2016; 41 pages.
USPTO Non-Final Rejection for U.S. Appl. No. 14/035,836 dated Jun. 9, 2016; 36 pages.
USPTO Non-Final Rejection for U.S. Appl. No. 14/035,836 dated Jul. 31, 2014; 21 pages.
USPTO Non-Final Rejection for U.S. Appl. No. 14/035,836 dated Sep. 10, 2015; 41 pages.
USPTO Non-Final Rejection for U.S. Appl. No. 14/272,376 dated Jul. 16, 2015; 18 pages.
USPTO Non-Final Rejection for U.S. Appl. No. 14/035,836 dated Dec. 14, 2016; 38 pages.

* cited by examiner

DEVELOPMENT, PROGRAMMING, AND DEBUGGING ENVIRONMENT

RELATED APPLICATION

This patent application is a continuation of U.S. patent application Ser. No. 13/740,022, filed Jan. 11, 2013, which is a continuation of U.S. patent application Ser. No. 12/776,175, filed May 7, 2010, which claims the benefit of U.S. Provisional Patent Application No. 61/176,272, filed May 7, 2009, all of which are incorporated by reference herein.

TECHNICAL FIELD

This disclosure relates generally to electronic systems, and, more particularly, to developing, programming, and debugging environment for programmable systems.

BACKGROUND

Microcontroller manufacturers and vendors often supply their customers with development tools that allow programmers to create software for the microcontrollers to execute. Similarly, many configurable hardware manufacturers will provide their customers with specialized hardware configuration tools that allow designers the ability to configure their hardware devices.

Some electronic systems include both configurable hardware components and a processing device, which can be programmed and configured to work together to implement various functions. When configuring these electronic systems, designers often will utilize software tools to program the processing device and utilize the specialized hardware configuration tools to configure the hardware components. In other words, the system designers manually manage multiple projects, e.g., the use of the multiple development tools, with differing development methodologies when attempting to cohesively develop, program, and debug these electronic systems.

SUMMARY

The patent application describes a method including receiving hardware description code that generically describes circuitry, and translating the hardware description code into one or more configuration files specific to a programmable system. The method also includes generating program code for a microcontroller of the programmable system based, at least in part, on the hardware description code, and configuring the programmable system to implement the circuitry according to the configuration files and the program code.

A system includes an interface device to receive hardware description code that describes hardware circuitry for a programmable system to implement, and to receive an indication to initiate automatic configuration and programming of the programmable system based on the hardware description code. The system further includes a processing system, responsive to the indication, to automatically generate one or more hardware configuration files and program code based, at least in part, on the hardware description code, and to automatically send the configuration files and the program code to the programmable system, wherein the programmable system is configured to implement the hardware circuitry according to the configuration files and the program code.

DETAILED DESCRIPTION

A Programmable System-on-Chip (PSoC™), such as that used in the PSoC™ family of products offered by Cypress Semiconductor Corporation (San Jose, Calif.), or other electronic system can include a microcontroller or other processing device and configurable hardware components, such as programmable analog and/or digital blocks. A processing system can implement a unified integrated development environment that allows designers to develop applications and program both the configurable hardware components and the microcontroller of the PSoC™ and/or electronic system. Embodiments are shown and described below in greater detail.

Figure 1:
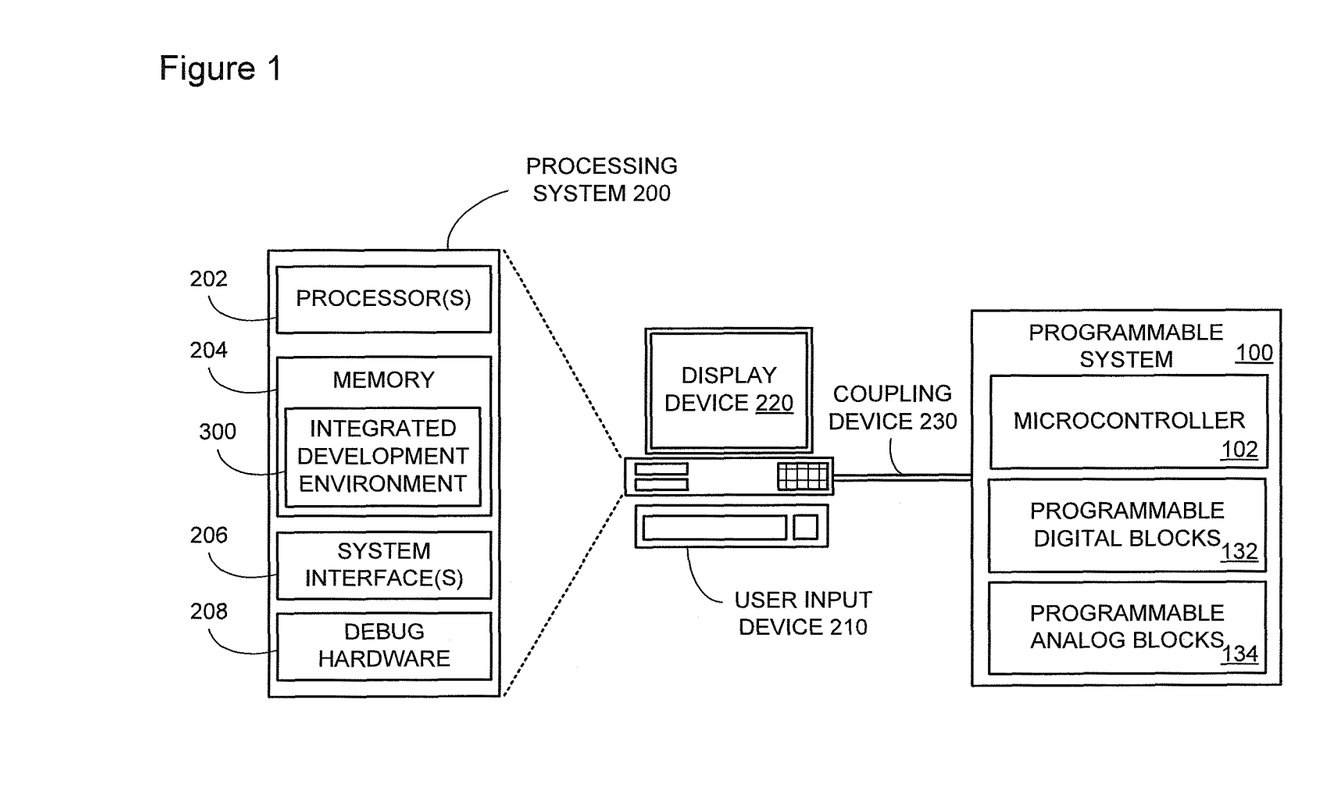
FIG. 1 shows a programmable system configurable by a processing system implementing an integrated development environment according to embodiments of the invention.

FIG. 1 shows a programmable system 100 configurable by a processing system 200 implementing an integrated development environment 300 according to embodiments of the invention. Referring to FIG. 1, the programmable system 100 includes a microcontroller 102 and configurable hardware components, such as programmable digital blocks 132 and programmable analog blocks 134. The microcontroller 102 can be programmed (and reprogrammed) and the programmable digital and analog blocks 132 and 134 can be configured (and reconfigured) to implement various applications and perform a variety functions. Embodiments of the programmable system 100 will be described below in greater detail.

The processing system 200 can implement an integrated development environment 300, allowing unified hardware and software development and configuration of the programmable system 100 with hardware configuration files and software programming developed by the integrated development environment 300. The processing system 200 can include one or more processors 202 to implement the integrated development environment 300, for example, by executing instructions stored in a memory system 204 or other computer readable medium.

After hardware configuration files and software programming is developed, the processing system 200 can program and/or configure the programmable system 100 with the developed hardware configuration and software programming, for example, through a coupling device 230. In some embodiments, the coupling device 230 can be a wired device, such as a Universal Serial Bus (USB) cable, Ethernet cable, etc, or can represent a wireless link between the processing system 200 and the programmable system 100.

The processing system 200 can include system interface devices 206 that allow the processing system 200 to communicate with external devices, such as the user input device 210, the display device 220, and the programmable system 100. For example, the processing system 200 can include a system interface 206 to communicate with the programmable system 100 over the coupling device 230. In some embodiments, the system interface devices 206 can receive inputs, for example, through the user input device 210, and present information, for example, via the display device 220.

The processing system 200 can develop hardware and software applications for the programmable system 100 in response to user input, for example, from the user input device 210. The integrated development environment 300 can include various development tools that allow system designers to describe hardware circuitry for the programmable system 100 to implement and to provide software or firmware code for the microcontroller 102. In some embodiments, the integrated development environment 300 can receive hardware description code that describes this hardware circuitry in an abstracted or generic manner, and can convert the generic code into device-specific configuration files that are particular to the architecture and/or resources of the programmable system 100. The hardware description code provided by the system designers can include schematic circuit diagrams and/or hardware code written according to a hardware description language, such as Verilog or VHDL.

The processing system 200 can also generate application programming interfaces based at least in part on the hardware description code. These application programming interfaces, when provided to the programmable system 100, can program the microcontroller 102 to communicate with the programmable digital and/or analog blocks 132 and 134 configured according to the device-specific configuration files.

The processing system 200 can send the device-specific configuration files and the application programming interfaces to the programmable system 100. The programmable system 100 can utilize the configuration files to configure particular hardware components in the programmable digital and/or analog blocks 132 and 134 to implement the hardware circuitry described by the hardware description code. The programmable system 100 can utilize the application programming interfaces to program the microcontroller 102 to communicate with the programmable digital and/or analog blocks 132 and 134 configured according to the device-specific configuration files.

After the programmable system 100 has been programmed with the hardware configuration and software or firmware programming developed with the integrated development environment 300, the processing system 200 can include debug hardware 208 to perform debugging operations on the programmable system 100. In some embodiments, the debug hardware 208 can be located externally from the processing system 200 and can communicate with the processing system 200 via the system interface devices 206.

Figure 2:
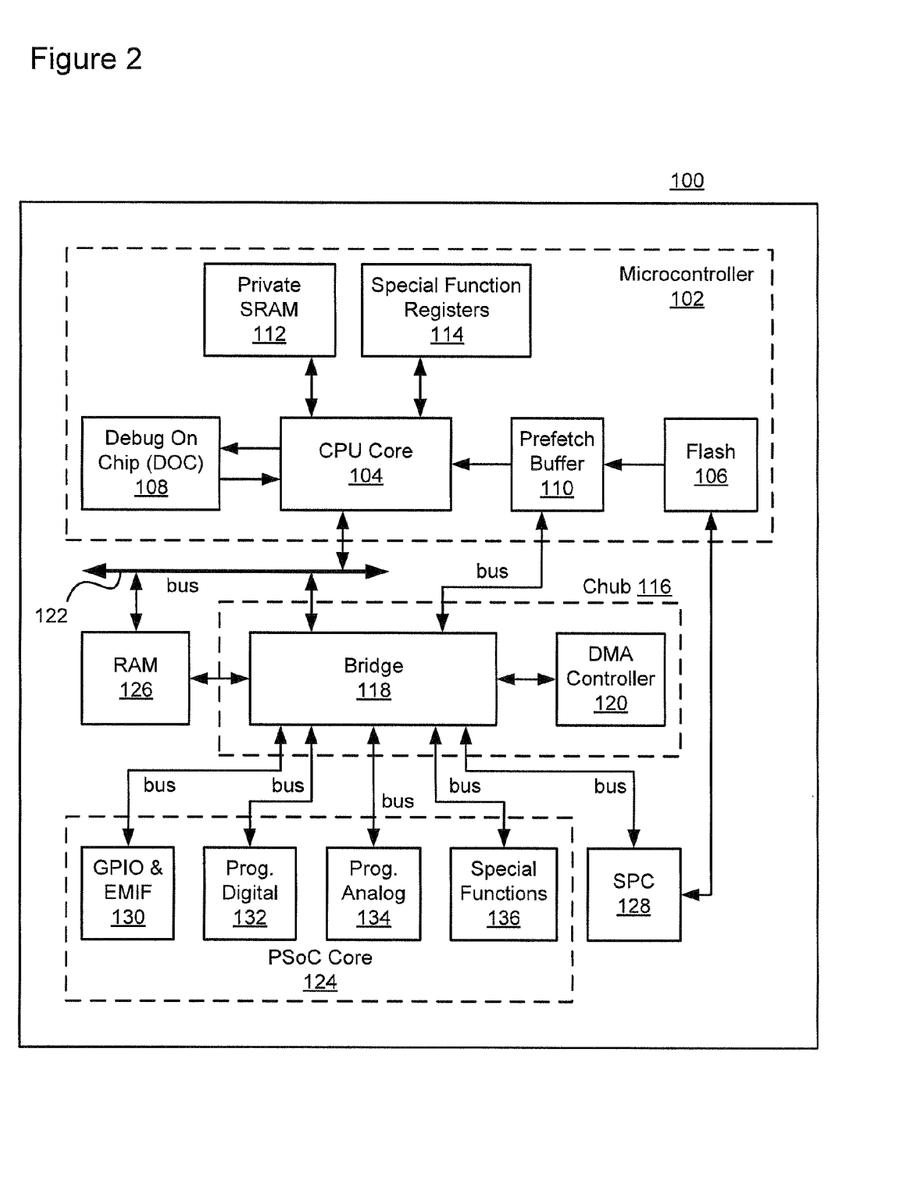
FIG. 2 illustrates an embodiment of a core architecture of a Programmable System-on-Chip (PSoC™) shown in FIG. 1.

FIG. 2 illustrates an embodiment of a core architecture of a Programmable System-on-Chip (PSoC™), such as that used in the PSoC3™ family of products offered by Cypress Semiconductor Corporation (San Jose, Calif.). Referring to FIG. 2, in one embodiment, the core architecture includes the microcontroller 102. The microcontroller 102 includes a CPU (central processing unit) core 104, flash program storage 106, DOC (debug on chip) 108, a prefetch buffer 110, a private SRAM (static random access memory) 112, and special functions registers 114. In an embodiment, the DOC 108, prefetch buffer 110, private SRAM 112, and special function registers 114 are coupled to the CPU core 104, while the flash program storage 106 is coupled to the prefetch buffer 110. The flash program storage 106 can be any type of program memory.

The core architecture may also include a CHub (core hub) 116, including a bridge 118, such as a single-level or multi-level Advanced High-Performance Bus Bridge, and optionally a DMA (direct memory access) controller 120, that is coupled to the microcontroller 102 via bus 122. The Chub 116 may provide the primary data and control interface between the microcontroller 102 and its peripherals and memory, and a programmable core 124. The DMA controller 120 may be programmed to transfer data between system elements without burdening the CPU core 104. In various embodiments, each of these subcomponents of the microcontroller 102 and CHub 116 may be different with each choice or type of CPU core 104. The Chub 116 may also be coupled to shared SRAM 126 and an SPC (system performance controller) 128. The private SRAM 112 is independent of the shared SRAM 126 that is accessed by the microcontroller 102 through the bridge 118. The CPU core 104 accesses the private SRAM 112 without going through the bridge 118, thus allowing local register and RAM accesses to occur simultaneously with DMA access to shared SRAM 126. Although labeled here as SRAM, these memory modules may be any suitable type of a wide variety of (volatile or non-volatile) memory or data storage modules in various other embodiments.

In various embodiments, the programmable core 124 may include various combinations of subcomponents (not shown), including, but not limited to, a digital logic array, digital peripherals, analog processing channels, global routing, analog peripherals, DMA controller(s), SRAM and other appropriate types of data storage, IO ports, and other suitable types of subcomponents. In one embodiment, the programmable core 124 includes a GPIO (general purpose IO) and EMIF (extended memory interface) block 130 to provide a mechanism to extend the external off-chip access of the microcontroller 102, a programmable digital block 132, a programmable analog block 134, and a special functions block 136, each configured to implement one or more of the subcomponent functions. In various embodiments, the special functions block 136 may include dedicated (non-programmable) functional blocks and/or include one or more interfaces to dedicated functional blocks, such as USB, a crystal oscillator drive, JTAG, and the like.

The programmable digital block 132 may include a digital logic array including an array of digital logic blocks and associated routing. In one embodiment, the digital block architecture is comprised of UDBs (universal digital blocks). For example, each UDB may include an ALU together with CPLD functionality or other types of digital programmable logic functions.

In various embodiments, one or more UDBs of the programmable digital block 132 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 104) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 134 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 134 may support various analog functions including, but not limited to, analog routing, LCD drive JO support, capacitive sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

Figure 3:
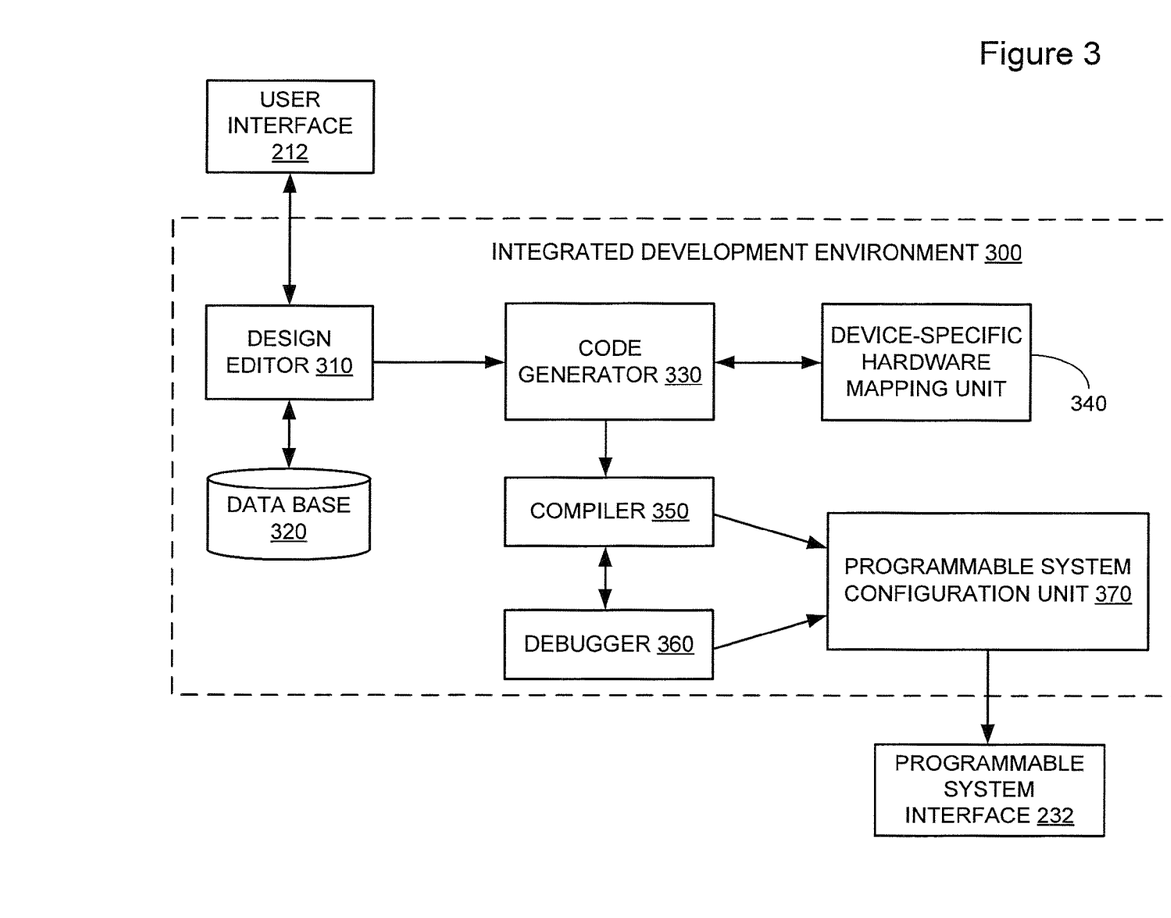
FIG. 3 illustrates an example embodiment of the processing system shown in FIG. 1.

FIG. 3 illustrates an example embodiment of the processing system 200 shown in FIG. 1. Referring to FIG. 3, the processing system 200 can implement the integrated development environment 300, for example, by executing instructions stored in the memory system 204 or other computer-readable medium. In some embodiments, the integrated development environment 300 can be at least partially implemented by a set of one or more discrete hardware components (not shown) in the processing system 200.

The integrated development environment 300 can include a design editor 310 to receive information describing hardware circuitry. This information describing hardware circuitry can be received from various sources and in various formats, for example, through a user interface 212. The design editor 310 can include various development tools that present a user or system designer options for inputting circuit designs or descriptions to the integrated development environment 300. For instance, the design editor 310 can receive code written according to a hardware description language, such as Verilog or VHDL. The design editor 310 can also provide a graphics-based circuit design application, such as a Schematic Editor, a Symbol Editor, a GPIF (General Programmable Interface) editor, etc, which allows designers to create schematic diagrams of the hardware circuitry to be implemented by the programmable system 100. In some embodiments, the design editor 310 can access a database 320 to help determine dependency, build rules, and debug rules for the received descriptions of the hardware circuitry.

The design editor 310 can also receive user-generated program code from the user interface 222. The program code can utilize at least one application programming interface generated by the integrated development environment to communicate with the hardware components in the programmable system 100. This program code can also include at least one application programming interface to allow the microcontroller 102 in the programmable system 100, when programmed with the code, to communicate with hardware components in the programmable system 100.

The integrated development environment 300 can include a code generator 330 to generate configuration files from the received descriptions of the hardware circuitry. In some embodiments, when the received descriptions of the hardware circuitry are in an abstracted or generic format, the code generator 330 can access a device-specific hardware mapping unit 340 to map the received descriptions of the hardware circuitry to the programmable digital and/or analog blocks 132 and 134 of the programmable system 100. In other words, the code generator 330 can determine where and how the programmable system 100 implements the generic circuitry provided by the user or system designer. This level of abstraction can allow users without specific knowledge of the programmable system 100 the ability to program and configure the programmable system 100 to perform various applications through the use of generic circuit descriptions and diagrams. The code generator 330 can generate the configuration files from the device-specific version of the hardware circuitry descriptions.

The code generator 330 can also generate application programming interfaces from the received descriptions of the hardware circuitry. The application programming interface, when provided to the programmable system 100, can program the microcontroller 102 and allow it to communicate with hardware components of the programmable system 100.

The integrated development environment 300 can include a compiler 350 to compile the configuration files and the application programming interfaces and link them to the programmable system 100. Once the configuration files and the application programming interfaces have been compiled and linked, the compiler 350 can provide them to a programmable system configuration unit 370 to send them to the programmable system 100, for example, via a programmable system interface 232. The programmable system 100 can configure its programmable digital and/or analog blocks 132 and 134 according to the configuration files and program the microcontroller 102 according to the application programming interfaces in order to implement the hardware circuitry described by the user.

The compiler 350 can also provide the configuration files and the application programming interfaces to a debugger 360, such as the debug hardware 208. The debugger 360 can perform debugging operations on the programmable system 100 as configured with the configuration files and the application programming interfaces. For instance, the debugger 360 can perform step over, step into, and step out operations, which allows users the ability to perform incremental evaluations that step through programming code.

Figure 4:
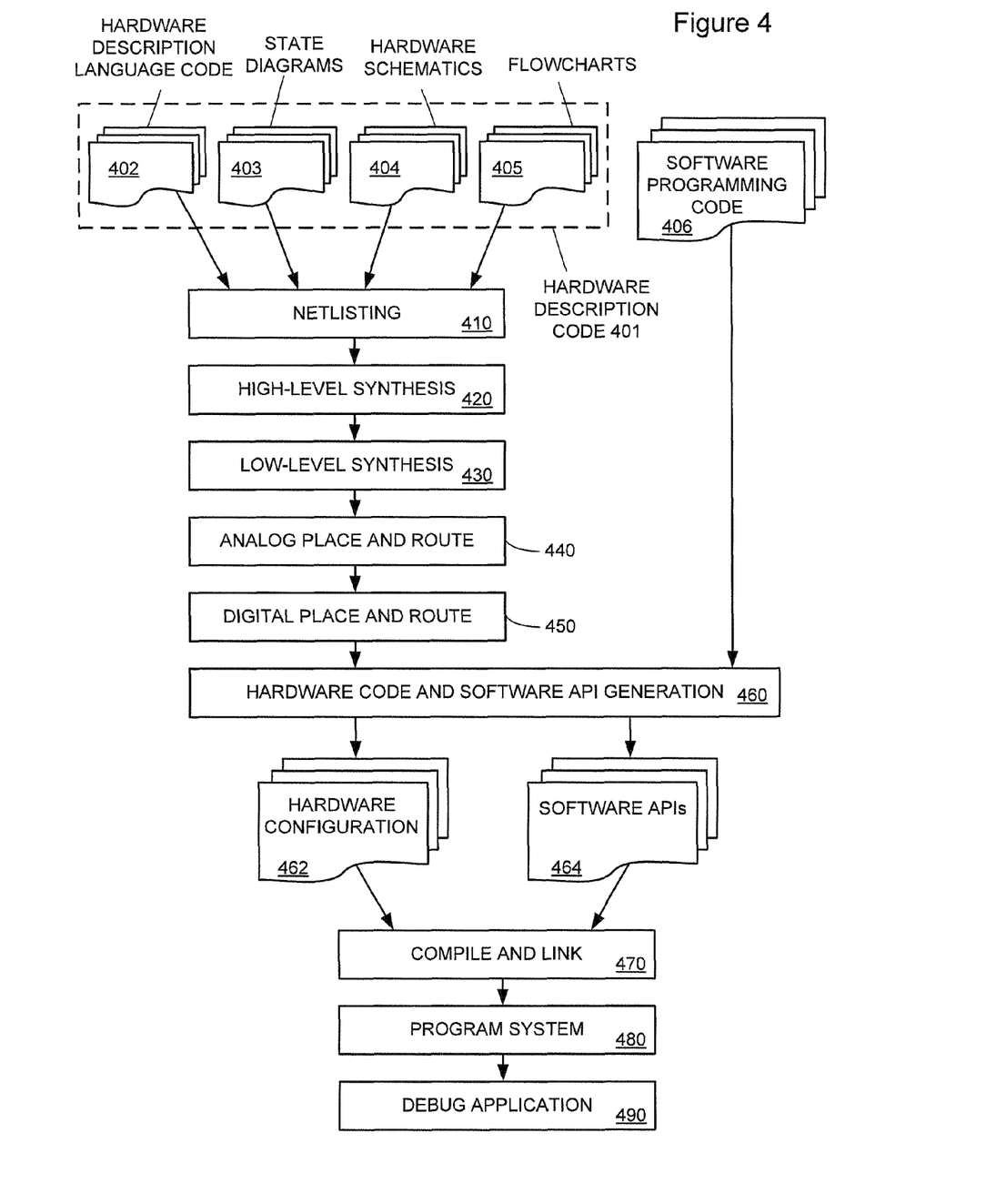
FIG. 4 is an example operational flowchart for the processing device implementing the integrated development environment according to embodiments of the invention.

FIG. 4 is an example operational flowchart for the processing device implementing the integrated development environment 300 according to embodiments of the invention. Referring to FIG. 4, the integrated development environment 300 can receive hardware description code 401, such as hardware description language code 402, state diagrams 403, hardware schematics 404, and flowcharts 405, which can describe hardware circuitry. The hardware circuitry can include one or more circuits to perform various application or functions and analog and/or digital signal routing associated with the circuits. The hardware description language code 402 can be written in Verilog, VHDL, or other similar hardware description language. The hardware schematics 404 can be schematic diagrams of the hardware circuitry created with a graphics-based circuit design application, such as a Schematic Editor, a Symbol Editor, a GPIF (General Programmable Interface) editor, etc.

The integrated development environment 300, in a block 410, can netlist the hardware description language code 402, the state diagrams 403, the hardware schematics 404, and/or the flowcharts 405 into a single representation of the hardware circuitry to be implemented by the programmable system 100. This netlisting of the hardware description language code 402, the state diagrams 403, the hardware schematics 404, and/or the flowcharts 405 can combine and integrate the circuitry descriptions, which have various formats, into the single representation of the hardware circuitry.

The integrated development environment 300, in a block 420, can perform high-level synthesis on the netlisted hardware description code. The high-level synthesis can breakdown or reduce the netlisted hardware description code into lower level primitives, logic equations, and/or flip-flops. This reduction of the netlisted hardware description code allows the integrated development environment 300, in a block 430, to map the reduced hardware description code to the programmable system 100 through low-level synthesis. The integrated development environment 300 can determine which hardware resources or components within the program system 100, such as the programmable digital blocks 132 and the programmable analog blocks 134, can implement the circuitry described by the reduced hardware description code according to a mapping.

The integrated development environment 300, in blocks 440 and 450, can perform placement and routing for both the programmable digital blocks 132 and the programmable analog blocks 134 of the programmable system 100. The placement and routing can determine where the hardware circuitry is to be placed in the programmable digital blocks 132 and the programmable analog blocks 134. The placement and routing can also allocate or set signal routing for the hardware circuitry placed in the programmable digital blocks 132 and the programmable analog blocks 134.

The integrated development environment 300, in a block 460, can generate perform hardware configuration files and application programming interfaces. The hardware configuration files can be based on the mapping of the reduced hardware description code and the place and routing analysis performed in blocks 430-450. The application programming interfaces can be based on the mapping of the reduced hardware description code and the place and routing performed in blocks 430-450, and can be based on software programming code 406 received from at least one system interface. The software programming code can include at least one application programming interface to allow the microcontroller 102 in the programmable system 100, when programmed with the software programming code, to communicate with hardware components in the programmable system 100.

The integrated development environment 300, in a block 470, can compile the hardware configuration files and the application programming interfaces, and link them to the programmable system 100. The integrated development environment 300, in a block 480, can send the compiled and linked hardware configuration files and the application programming interfaces to the programmable system 100. The programmable system 100 can be configured to implement the hardware circuitry described in the hardware description language code 402, the state diagrams 403, the hardware schematics 404, and/or the flowcharts 405 responsive to the hardware configuration files and the application programming interfaces. The integrated development environment 300, in a block 490, can execute a debugging application to debug the programmable system 100 as configured with the hardware configuration files and the application programming interfaces.

In some embodiments, the integrated development environment 300 can receive an indication to initiate automatic configuration and programming of the programmable system 100 after receiving the input information 402, 404, and 406. The integrated development environment 300 can automatically perform operations associated with the blocks 410-490 in response to receiving the indication. In some embodiments, the indication can be received from a user via at least one of the system interfaces. Although FIG. 4 shows blocks 410-490 being performed in a particular processing order, in some embodiments the integrated development environment 300 can perform the operations in different orders.

Figure 5:
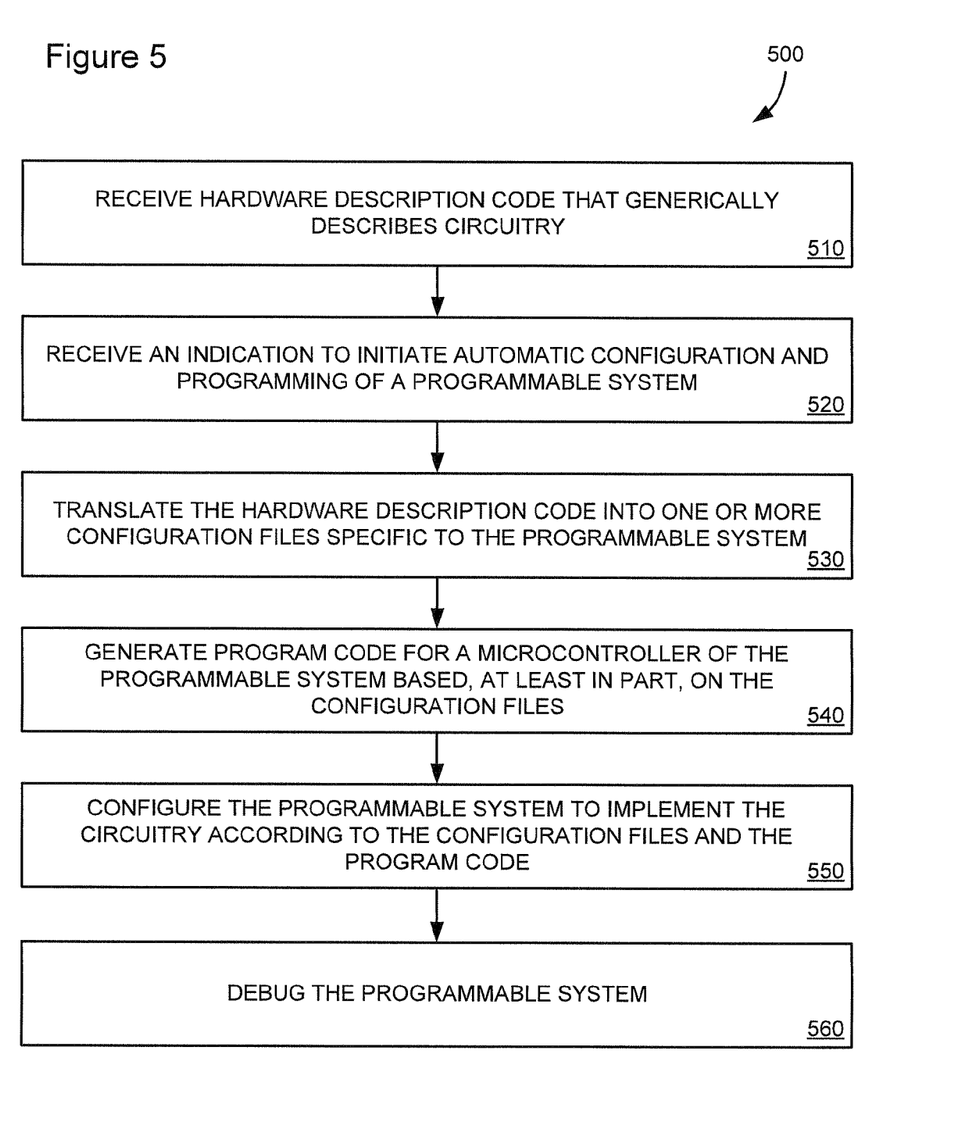
FIG. 5 is an example operational flowchart for the integrated development environment according to embodiments of the invention.

FIG. 5 is an example operational flowchart of the integrated development environment 300 according to embodiments of the invention. Referring to FIG. 5, in a first block 510, the integrated development environment 300 can receive hardware description code that generically describes circuitry. In some embodiments, the hardware description code can be code written in Verilog, VHDL, or other similar hardware description language, or schematic diagrams of the circuitry created with a graphics-based circuit design application, such as a Schematic Editor, a Symbol Editor, a GPIF (General Programmable Interface) editor, etc. The integrated development environment 300 can also receive program code for a microcontroller 102 in the programmable system 100

In a next block 520, the integrated development environment 300 can receive an indication to initiate automatic configuration and programming of the programmable system. In some embodiments, the indication can be received from a user via at least one of the system interfaces. The integrated development environment 300 can automatically perform the blocks 530-560 in response to receiving the indication.

In block 530, the integrated development environment 300 can translate the hardware description code into one or more configuration files specific to a programmable system 100. The translation of the hardware description code into the configuration files can include multiple operations. For example, the hardware description code can be netlisted into a single representation of the circuitry. The netlisted code can be reduced into lower-level primitives, logic expressions, and flip-flops. The reduced code can be mapped to the programmable device 100 to determine how the programmable system 100 can implement the circuitry. The mapped code can be analyzed to determine placement and routing of the circuitry implemented by the programmable system 100. The integrated development environment 300 can translate the mapped code that has undergone placement and routing analysis into one or more configuration files that are specific to the programmable system 100.

In block 540, the integrated development environment 300 can generate program code for a microcontroller 102 of the programmable system 100 based, at least in part, on the hardware description code. In some embodiments, the program code can be application programming interfaces for the microcontroller 102 to communicate with the hardware components of the programmable system 100.

In block 550, the integrated development environment 300 can configure the programmable system 100 to implement the circuitry according to the configuration files and the program code. The integrated development environment 300 can provide the configuration files and the program code to the programmable system 100. The configuration files and the program code can prompt the programmable system 100 to implement the circuitry described by the hardware description code.

In block 560, the integrated development environment 300 can debug the programmable system 100 as programmed by the configuration files and the program code.

One of skill in the art will recognize that the concepts taught herein can be tailored to a particular application in many other ways. In particular, those skilled in the art will recognize that the illustrated embodiments are but one of many alternative implementations that will become apparent upon reading this disclosure.

The preceding embodiments are examples. Although the specification may refer to "an", "one", "another", or "some" embodiment(s) in several locations, this does not necessarily mean that each such reference is to the same embodiment(s), or that the feature only applies to a single embodiment.

What is claimed is:

1. A computer-implemented method, comprising:
receiving, by a processing device associated with an integrated development environment, an indication to initiate generation of hardware configuration information for a programmable device;
in response to receiving the indication to initiate generation of configuration information, translating, by the processing device, hardware description information into one or more configuration files,
wherein the hardware configuration information comprises:
information describing the configuration of at least one of a first plurality of programmable analog blocks, and
information describing the configuration of at least one of a second plurality of programmable digital blocks; generating routing information automatically based on the hardware description information and the hardware configuration information, and
wherein translating the hardware description code into the one or more configuration files comprises:
converting the hardware description code into a representation of the circuitry,
mapping the converted hardware description code to specific programmable hardware components in the programmable system, and
assigning placement and routing of the circuitry to the mapped, converted hardware description code;
generating program code for a microcontroller of the programmable device based, at least in part, on the hardware description information, wherein the generating program code for a microcontroller of the programmable device comprises generating an application programming interface (API) for communicating, by the microcontroller, with at least one of the first plurality of programmable analog blocks or at least one of the second plurality of programmable digital blocks of the programmable device; and
generating a programming file for the programmable device based on the, the hardware configuration information, the routing information, and the program code.

2. The computer-implemented method of claim 1, wherein the receiving the indication to initiate generation of hardware configuration information for a programmable device is through a system interface associated with the integrated development environment.

3. The computer-implemented method of claim 1, wherein the hardware description information comprises at least one of a schematic circuit diagram, a flowchart, a state diagram, or code written according to a hardware description language.

4. The computer-implemented method of claim 1, further comprising providing the programming file to the microcontroller of the programmable device.

5. The computer-implemented method of claim 1, further comprising debugging the configured programmable device by performing at least one of a step over, a step into, or a step out operation, to allow incremental evaluations that step through the program code.

6. The computer-implemented method of claim 1, wherein the performing the translating hardware description information, the generating routing information, the generating program code, the generating a programming file, and the debugging are automatic in response to receiving the indication.

7. The computer-implemented method of claim 1, wherein the routing information is for configuring programmable routing circuitry to couple at least one of the first plurality of programmable analog blocks to at least one of the items selected from the group consisting of at least one programmable digital block of the second plurality of programmable digital blocks, at least one other programmable analog block of the first plurality of programmable blocks, the microcontroller, and at least one of a third plurality of IO pins.

8. A non-transitory computer-readable storage medium to store instruction configured to cause a processing device to perform operations comprising:
receiving, by a processing device associated with an integrated development environment, an indication to initiate generation of hardware configuration information for a programmable device;
in response to receiving the indication to initiate generation of hardware configuration information, translating, by the processing device, hardware description information into one or more configuration files,
wherein the hardware configuration information comprises:
information describing the configuration of at least one of a first plurality of programmable analog blocks, and
information describing the configuration of at least one of a second plurality of programmable digital blocks, and wherein translating the hardware description code into the one or more configuration files comprises:
converting the hardware description code into a representation of the circuitry,
mapping the converted hardware description code to specific programmable hardware components in the programmable system, and
assigning placement and routing of the circuitry to the mapped, converted hardware description code;
generating routing information automatically based on the hardware description information and the hardware configuration information;
generating program code for a microcontroller of the programmable device based, at least in part, on the hardware description information, wherein the generating program code for a microcontroller of the programmable device comprises generating an application programming interface (API) for communicating, by the microcontroller, with at least one of the first plurality of programmable analog blocks or at least one of the second plurality of programmable digital blocks of the programmable device; and
generating a programming file for the programmable device based on the, the hardware configuration information, the routing information, and the program code.

9. The non-transitory computer-readable storage medium to store instruction configured to cause a processing device to perform operations of claim 8, wherein the receiving the indication to initiate generation of hardware configuration information for a programmable device occurs through a system interface associated with the integrated development environment.

10. The non-transitory computer-readable storage medium to store instruction configured to cause a processing device to perform operations of claim 8, wherein the hardware description information comprises at least one of a schematic circuit diagram, a flowchart, a state diagram, or code written according to a hardware description language.

11. The non-transitory computer-readable storage medium to store instruction configured to cause a processing device to perform operations of claim 8, further comprises providing the programming file to the microcontroller of the programmable device.

12. The non-transitory computer-readable storage medium to store instruction configured to cause a processing device to perform operations of claim 8, further comprising debugging the programmable device as configured by the configuration file, routing information, and program code, wherein the debugging the programmable device comprises performing at least one of a step over, a step into, or a step out operation, to allow incremental evaluations that step through the program code.

13. The non-transitory computer-readable storage medium to store instruction configured to cause a processing device to perform operations of claim 8, further comprising performing the translating hardware description information, generating routing information, generating program code, generating a programming file, and debugging automatically in response to receiving the indication.

14. The non-transitory computer-readable storage medium to store instruction configured to cause a processing device to perform operations of claim 8, wherein the routing information is for configuring programmable routing circuitry to couple at least one of the first plurality of programmable analog blocks to at least one of the items selected from the group consisting of at least one programmable digital block of the second plurality of programmable digital blocks, at least one other programmable analog block of the first plurality of programmable blocks, the microcontroller, and at least one of a third plurality of IO pins.

15. A processing device associated with an integrated development environment for configuring a programmable device, the processing device having a memory storing executable instructions configured to:
receive an indication to initiate generation of hardware configuration information for a programmable device;
in response to receiving the indication to initiate generation of hardware configuration information, translate, by the processing device, hardware description information into one or more configuration files,
wherein the hardware configuration information comprises:
information describing the configuration of at least one of a first plurality of programmable analog blocks, and
information describing the configuration of at least one of a second plurality of programmable digital blocks, and
wherein translating the hardware description code into the one or more configuration files comprises:
converting the hardware description code into a representation of the circuitry,
mapping the converted hardware description code to specific programmable hardware components in the programmable system, and
assigning placement and routing of the circuitry to the mapped, converted hardware description code;
generate routing information automatically based on the hardware description information and the hardware configuration information;
generate program code for a microcontroller of the programmable device based, at least in part, on the hardware description information;
generate an application programming interface (API) for communicating, by the microcontroller, with at least one of the first plurality of programmable analog blocks or at least one of the second plurality of programmable digital blocks of the programmable device; and
generate a programming file for the programmable device based on the, the hardware configuration information, the routing information, and the program code.

16. The processing device of claim 15, further configured to debug the programmable device as configured by the configuration file, routing information, and program code, wherein the debugging the programmable device comprises performing at least one of a step over, a step into, or a step out operation, to allow incremental evaluations that step through the program code.

17. The processing device of claim 16, wherein the routing information is for configuring programmable routing circuitry to couple at least one of the first plurality of programmable analog blocks to at least one of the items selected from the group consisting of at least one programmable digital block of the second plurality of programmable digital blocks, at least one other programmable analog block of the first plurality of programmable blocks, the microcontroller, and at least one of a third plurality of IO pins.

* * * * *